US010799883B2

(12) United States Patent
Pourprix et al.

(10) Patent No.: US 10,799,883 B2
(45) **Date of Patent: *Oct. 13, 2020**

(54) METHOD FOR THE SELECTIVE PURIFICATION OF AEROSOLS

(71) Applicant: COMMISSARIAT A L'ENERGIE ATOMIQUE ET AUX ENERGIES ALTERNATIVES, Paris (FR)

(72) Inventors: Michel Pourprix, Montlhery (FR); Christophe Brouard, Grenoble (FR); Simon Clavaguera, Gernoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 360 days.

This patent is subject to a terminal disclaimer.

(21) Appl. No.: 15/744,362

(22) PCT Filed: Jul. 28, 2016

(86) PCT No.: PCT/EP2016/068002
§ 371 (c)(1),
(2) Date: Jan. 12, 2018

(87) PCT Pub. No.: WO2017/017185
PCT Pub. Date: Feb. 2, 2017

(65) Prior Publication Data

US 2018/0200728 A1 Jul. 19, 2018

(30) Foreign Application Priority Data

Jul. 28, 2015 (FR) ..................................... 15 57224

(51) Int. Cl.
*B03C 3/02* (2006.01)
*B03C 3/06* (2006.01)
(Continued)

(52) U.S. Cl.
CPC ................ *B03C 3/025* (2013.01); *B03C 3/06* (2013.01); *B03C 3/12* (2013.01); *B03C 3/361* (2013.01);
(Continued)

(58) Field of Classification Search
CPC combination set(s) only.
See application file for complete search history.

(56) References Cited

U.S. PATENT DOCUMENTS 3,413,545 A * 11/1968 Whitby ............. G01N 15/0266 324/71.1
45,277,682 7/1981 Madalaine et al.
(Continued)

FOREIGN PATENT DOCUMENTS

DE 3324803 A1 1/1985
DE 196 50 585 A1 6/1998
(Continued)

OTHER PUBLICATIONS

French Preliminary Search Report from Corresponding French Application No. FR1557224 dated Jun. 10, 2016.
(Continued)

*Primary Examiner* — Christopher P Jones
*Assistant Examiner* — Sonji Turner
(74) *Attorney, Agent, or Firm* — Pearne & Gordon LLP

(57) ABSTRACT

The invention relates to a method for the selective purification of aerosols. The invention consists in electrostatically collecting all of the particles present in an aerosol, but with separation of the mechanisms on one hand for charging particles by unipolar ion diffusion in order to charge and then collect the finest particles, and on the other hand for charging particles by means of Corona discharge in order to charge and then collect the largest particles on a substrate different from the substrate for collecting the finest particles.

3 Claims, 2 Drawing Sheets

(51) Int. Cl.
- *B03C 3/12* (2006.01)
- *B03C 3/36* (2006.01)
- *B03C 3/41* (2006.01)
- *B03C 3/49* (2006.01)
- *G01N 1/22* (2006.01)
- *G01N 15/02* (2006.01)
- *G01N 15/00* (2006.01)

(52) U.S. Cl.
CPC ............... *B03C 3/368* (2013.01); *B03C 3/41* (2013.01); *B03C 3/49* (2013.01); *G01N 1/2202* (2013.01); *G01N 15/0266* (2013.01); *G01N 2001/2223* (2013.01); *G01N 2015/0046* (2013.01)

(56) References Cited

U.S. PATENT DOCUMENTS

| | | | |
|---|---|---|---|
| 6,004,376 A | 12/1999 | Frank | |
| 6,761,752 B2* | 7/2004 | Fissan | B03C 3/06 95/74 |
| 8,044,350 B2 | 10/2011 | Chen et al. | |
| 2010/0101420 A1 | 4/2010 | Kakinohara et al. | |
| 2013/0036906 A1 | 2/2013 | Dunn | |
| 2015/0226427 A1* | 8/2015 | Laitinen | B03C 3/743 95/79 |
| 2018/0200728 A1* | 7/2018 | Pourprix | B03C 3/12 |

FOREIGN PATENT DOCUMENTS

| | | |
|---|---|---|
| EP | 0008967 A1 | 3/1980 |
| EP | 2 131 017 A1 | 12/2009 |

OTHER PUBLICATIONS

International Search Report for corresponding International Application No. PCT/EP2016/068002 dated Oct. 10, 2016.
Written Opinion for corresponding International Application No. PCT/EP2016/068002 dated Oct. 10, 2016.
W. Hinds, "Aerosol Technology", 2nd Edition, 1999 (cited in the specification).
P. Intra and N. Tippayawong, "Aerosol an Air Quality Research", 11: 187-209, 2011 (cited in the specification).
G.W. Hewitt, "The Charging of small Particles for Electrostatic Precipitation", AIEE Trans., 76: 300-306, 1957 (cited in the specification).
G. Biskos, K. Reavell, N. Collings, "Electrostatic Characterisation of Corona Wire Aerosol Chargers", J. Electrostat. 63: 69-82, 2005 (cited in the specification).
D.Y.H. Pui, S. Fruin, P.H. McMurry, "Unipolar Diffusion Charging of Ultrafine Aerosols", Aerosol Sciences Technology 8: 173-187, 1988 (cited in the specification).
P. Kulkami, P.A. Baron, K. Willeke, "Aerosol Measurement" 3rd Edition 2011 (cited in the specification).
C. Monsanglant-Louvet, F. Gensdarmes, N. Liatimi, S. Pontreau. "Evaluation des performances des moniteurs de contamination atmosphérique en conditions réelles de fonctionnement" [Evaluation of the performance of atmospheric contamination monitors under real operating conditions], Scientific and technical report, IRSN: 251-259, 2008 (cited in the specification).

* cited by examiner

Fig. 2

METHOD FOR THE SELECTIVE PURIFICATION OF AEROSOLS

TECHNICAL FIELD

The present invention relates to the field of purifying an aerosol likely to contain particles in suspension.

The aim of the present invention is to improve the methods for purifying an aerosol by electrostatic precipitation in order to allow collection of particles in suspension in aerosols that is simultaneous but selective as a function of their dimensions, with the selectivity preferably intended to collect, and at the same time separate, micron-sized particles and nanometric particles.

"Nanoparticle" is understood in terms of the standard definition according to standard ISO TS/27687: a nano-object, the three dimensions of which are on the nanometric scale, i.e. a particle with a nominal diameter that is less than approximately 100 nm.

PRIOR ART

Since the 1970s, awareness of the environmental and health implications caused by aerosols has been the source of new technological developments in order to better evaluate the associated risks.

The field rapidly expanded in the 1980s to include the use of aerosols in high-technology production methods and the control of aerosol contamination in ultra-clean atmospheres. From the 1990s, research intensified on the properties of ultrafine particles, i.e. those smaller than 100 nm, and on the effect of aerosols on the climate. The field is therefore very broad, since it simultaneously covers the fields of industrial hygiene, of air pollution control, of inhalation toxicology, of atmospheric physics and chemistry and of radioactive aerosol contamination in installations or in the environment.

More recently, the rapid growth of nanotechnologies in various fields, such as health, microelectronics, energy technologies or everyday consumer products such as paints and cosmetics, means that it is crucial for work to continue on the health and environmental implications of these new materials in order to ensure optimal safety conditions.

Therefore, methods and tools need to be developed for evaluating the exposure of workers, consumers and the environment to particles, and particularly to nanoparticles.

The development of methods and devices for sampling and analysing aerosols over a wide range of particle sizes, up to nanometric size, is thus a critical issue in terms of public health and of the prevention of the associated risks.

In particular, the development of sampling devices adapted to be portable and to be fixed as a unit to coveralls of a worker at a station for manufacturing nano-objects or processing nanomaterials or using the latter could prove to be essential.

Numerous devices exist for sampling and collecting particles in suspension in aerosols with a view to analyzing them in situ or in a laboratory. They may implement collection by filtration on fibers or on porous membranes, collection by diffusion for the finest particles, collection under the effect of an inertial force field (impactors, cyclones, centrifuges) or gravity force field (sedimentation chambers, elutriators) for the biggest particles, or even collection under the effect of an electric, thermal or radiation force field.

Among these devices, those which are electrostatic, i.e. the operating principle of which is based on implementing an electric field, particularly an intense electric field for creating a corona discharge effect, are commonly used.

When an intense electric field is generated in a volume where aerosol particles are present, said particles may be electrically charged through two distinct charging mechanisms and this may occur concurrently.

Publication [1], particularly FIG. 15.4 on page 330 of this publication, shows that the unipolar ion diffusion charging mechanism, associated with the field charging mechanism, is applicable to a wide range of particle sizes, at least for particles with dimensions between 0.01 and 10 µm. It is also clear that the unipolar ion diffusion charging mechanism is especially predominant for the finest particles, typically the nanoparticles, i.e. those smaller than 100 nm. By contrast, the field charging mechanism is more efficient for the big particles, i.e. the micron-sized and sub-micron-sized particles ($\geq 300$ nm).

By way of an example, if the electrical mobility of a particle, denoted Z, is considered to be approximately 1 $cm^2/st \cdot V \cdot s$ in CGS electrostatic units, that is $3.3 \times 10^{-7}$ $m^2/V \cdot s$ in SI units, then this particle placed between two plane and parallel plates that generate an electric field E of $10^5$ V/m reaches a speed W equal to the product Z*E, that is W of approximately 0.033 m/s. It clearly may be seen that the electrostatic force generates speeds much higher than the other force fields experienced by a particle, namely the gravity, inertial, thermal and radiation fields. This advantage is exploited in the operation of commercially available electrostatic purifiers, where the diffusion charging and field charging processes may act together.

Electrically charging aerosol particles requires the presence of a high concentration of unipolar ions. The method that is by far the most efficient for creating these ions in atmospheric air is the corona discharge method.

In order to produce a corona discharge, an electrostatic field must be established with a geometry that allows it to be rendered non-uniform. More specifically, this high electric field (several thousand to tens of thousands of volts per centimeter in the vicinity of the discharge electrode) is induced by two electrodes disposed close to each other: a first biased electrode, or discharge electrode, generally in the form of a wire or a point, being disposed facing a second electrode, which electrode is in the form of a counter electrode, generally having a plane or cylindrical geometry. The electric field that exists between the two electrodes ionizes the gas volume located in the inter-electrode space and particularly a sheath or ring of ionized gas located around the discharge electrode. The created charges, by migrating toward the counter electrode, charge the particles to be separated that are contained in the gas. The charged particles that are thus created then migrate toward the counter electrode, on which they may be collected. This counter electrode is commonly called collection electrode. Due to the required electric field level, a discharge electrode needs to be used that has a (very) low curvature radius. The discharge electrodes that are encountered are therefore generally either fine points or small diameter wires. Therefore, through a process based on the electrons and the ions created by natural irradiation, the electrons are accelerated in the intense electric field created in the vicinity of the electrode with a (very) low curvature radius. Due to the high imposed voltage, if this field exceeds a critical value, an avalanche effect causes the ionization of the air in this space. This phenomenon is called corona discharge.

By way of an example, FIGS. 1A to 1E show some configurations of electrodes that are best adapted for obtaining a corona discharge, namely, respectively, a point-plane (FIG. 1A), blade-plane (FIG. 1B), wire-plane (FIG. 1C), wire-wire (FIG. 1D), wire-cylinder (FIG. 1E) arrangement.

For example, in the point-plane configuration, if the point is positive relative to the plane, the electrons rapidly move toward the point, whereas the positive ions move toward the plane, then creating a positive unipolar space. Furthermore, an ion wind, also called ionic wind, is established, which is characterized by an airflow directed from the point toward the plane arising from the collisions of positive ions with the surrounding neutral molecules.

Conversely, if the point is negative relative to the plane, the positive ions move toward the point and the electrons move toward the plane by attaching to the air molecules in order to form negative ions. In any case, even if the process for creating positive or negative ions is not exactly symmetrical, the unipolar ions migrate from the point toward the plane with a high concentration of approximately $10^6$ to $10^9/cm^3$ and, regardless of the polarity, an electric wind arises that is directed from the point toward the plane.

Thus, introducing aerosol particles into the point-plane space allows them to be charged with the same polarity as the point, using a field charging process. Furthermore, the field used to create the corona effect and the electric wind also participate in the field charging process.

For the other configurations shown in FIGS. 1B to 1E, the processes for producing ions and for field charging of the particles are similar in all respects.

Certain marketed electrostatic precipitators that are used to sample and collect particles on a support that enables analysis operate on this principle.

For example, FIG. 15.9 on page 341 of publication [1], already cited, shows an arrangement that allows aerosol particles to be deposited on an electron microscope grid, the particles being charged and precipitated in a point-plane configuration.

Another example is shown in FIG. 10.10 on page 223 of this same publication [1] and implements the charging and precipitation technique in a point-plane geometry for collecting aerosol particles on a piezoelectric crystal.

As already mentioned, the unipolar ion diffusion charging mechanism is predominantly applicable to the finest particles. This mechanism is increasingly implemented in nanoparticle metrology, particularly for determining their particle size. Indeed, many authors have studied and continue to study devices capable of providing the finest particles with high electrical mobility, in order to be able to select them in instruments adapted to this new field. In particular, article [2] may be cited to this end, which reviews most of the technologies developed to date, or even the principle developed by the author of publication [3], which uses a wire-cylinder configuration, which has been widely studied more recently, as shown in publication [4], but also previously (publication [5]).

FIG. 2 is a schematic representation of a unipolar ion diffusion charging device, also called charger, the geometry of which is of the wire-cylinder type, as shown in publication [4]. The charger 10 comprises a body 1 with rotational symmetry in two parts that support a hollow metal cylinder 11 forming an external electrode connected to an alternating current power supply and a central metal wire 12 arranged along the axis of the body and connected to a high-voltage power supply, not shown. A cylindrical gate 14 forming an internal electrode is also annularly arranged around the central wire 12. The aerosol containing the particles to be charged circulates in the charger 10, from the inlet orifice 17 to the outlet orifice 18, by passing through the space 15 that is delimited between the internal electrode 14 formed by the gate and the external electrode 11 formed by the cylinder.

This charger 10 operates as follows: ions are produced by a corona effect on the central wire 12 and are collected by the gated internal electrode 14 taken to a low potential, typically to ground. A portion of these ions exits this gate 14 to proceed toward the internal surface of the peripheral cylinder 11 due to the voltage applied thereto. The aerosol particles pass through the space 15 between the gate 14 and the cylinder 11 and are thus charged by diffusion by the unipolar ions that exited the gate 14. The diffusion charging mechanism operates as a function of the product N*t, where N represents the concentration of unipolar ions and t represents the residence time of the particles. The diffusion charging mechanism is the only mechanism able to take place as it is not possible to have a field charging mechanism since the electric field is very weak in the space 15.

It is worthwhile noting that the process for charging aerosols by unipolar ion diffusion allows a given number of electric charges to be imparted to a particle of given size.

This principle is also implemented in differential electrical mobility analyzers (DMA), which are instruments capable of providing the particle size distribution of fine particles by counting the concentration of particles in a given electrical mobility classification. Such a device is implemented in U.S. Pat. No. 8,044,350 B2, for example.

It is clear from studying the prior art that a device has not been proposed that allows both the simultaneous collection of the particles contained in an aerosol, and which differ in size over a wide size range, typically between several nanometers and several tens of micrometers, and the separation thereof into limited size ranges, preferably separating the nanoparticles from the micron-sized particles.

Various methods of electrostatic precipitation exist for purifying an aerosol. To the knowledge of the inventors, none of these methods allow particles contained in the aerosol to be collected and separated as a function of their limited size range.

Presently, a requirement exists for such a method, particularly in order to remove fine particles so as to retain only large particles. One specific application concerns the measuring of atmospheric contamination by radioactive aerosols.

The general aim of the invention is thus to at least partially meet this need.

DISCLOSURE OF THE INVENTION

To this end, the initial subject of the invention is a method for selectively purifying an aerosol comprising the following steps:
  sucking the aerosol through a, preferably cylindrical, conduit from its inlet orifice;
  charging the finest particles, downstream of the inlet orifice, by unipolar ion diffusion in a space between an electrode in the form of a gate surrounding an electrode in the form of a wire, and a first conductive portion of the internal wall of the conduit;
  generating an electric field without a corona effect in the space between an electrode and a second conductive portion of the internal wall of the conduit, in order to collect the finest particles charged by the diffusion charger by deposition onto a first collection substrate (Zn);
  generating an electric field with a corona effect in the space between the wire or the point of an electrode and a third conductive portion of the internal wall of the conduit, in order to collect the biggest particles not charged by the diffusion charger by deposition onto a second collection substrate (Zm) distinct from the first collection substrate;

extracting purified air from the outlet orifice of the conduit.

The method may further comprise at least one step of recycling or reusing the finest particles collected on the first substrate and/or the biggest particles collected on the second substrate.

Thus, the invention consists in electrostatically collecting all the particles present in an aerosol, but with decoupling of the mechanisms, on the one hand, for charging particles by unipolar ion diffusion in order to charge, then collect the finest particles and, on the other hand, for electric field charging with a corona effect in order to charge and collect the biggest particles on a different substrate from the collection substrate for the finest particles.

In other words, the invention consists in firstly electrically charging the fine particles by unipolar ion diffusion, then electric field charging the biggest particles and collecting each group of particles thus charged on a suitable support according to their size.

Therefore, the invention allows the particles to be carefully classified according to their particle size by depositing them in physically distinct zones.

For particular applications, the method according to the invention makes it possible to separate the finest fraction of the particles while allowing through the coarsest fraction. The application in the early detection of incidents by measuring the atmospheric contamination by radioactive aerosols in certain workshops is proposed.

One alternative is the collection of the particles of reusable material or of the strategic raw materials present in particulate form in aerosols.

According to an advantageous variant of the invention, the method further comprises the following steps:

a/ collecting radioactive particles on the first and/or the second collection substrate during a time period t1;

b/ counting pulses generated by the ionization current of the air in the spaces during a time period t2.

DETAILED DESCRIPTION

Further advantages and features will become more clearly apparent upon reading the detailed description, which is provided by way of a non-limiting illustration, with reference to the following figures, in which:

FIGS. 1A to 1E are schematic views of different configurations of electrodes for obtaining a corona electrical discharge effect;

FIG. 2 is a longitudinal cross-sectional view of a charging device or a unipolar ion diffusion charger;

Figure 3:
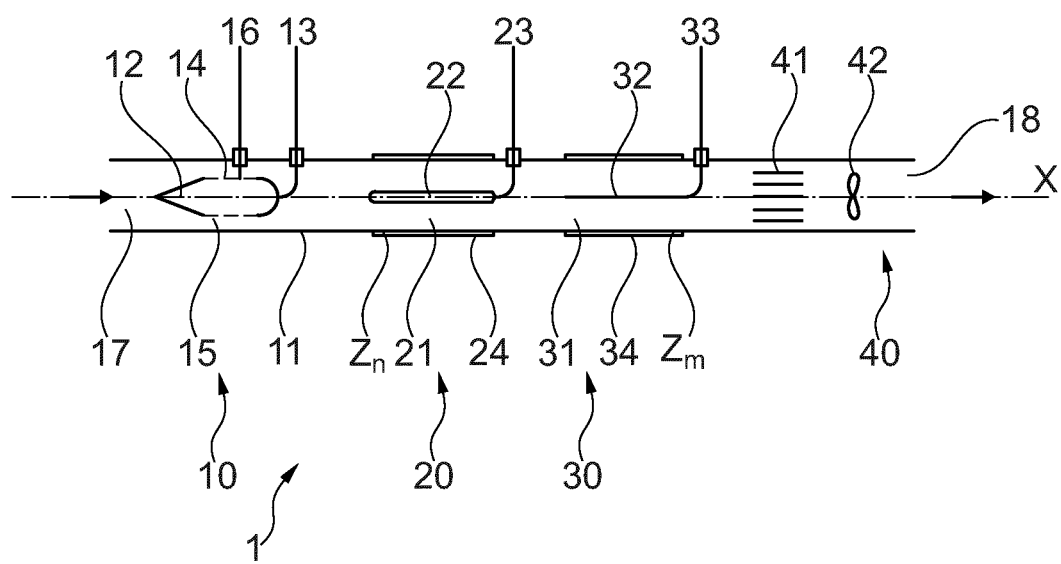
FIG. 3 is a schematic longitudinal cross-sectional view of a first example of a particle collection device according to the invention.

Throughout the present application, the terms "inlet", "outlet", "upstream" and "downstream" are to be understood with reference to the direction of the suction flow through a collection device according to the invention. Therefore, the inlet orifice denotes the orifice of the device through which the aerosol containing the particles is sucked, whereas the outlet orifice denotes the orifice through which the air flow exits.

FIGS. 1A to 1E and 2 have already been described in the preamble. They are not described hereafter.

FIG. 3 shows an example of an electrostatic device 1 according to the invention for selectively purifying an aerosol likely to contain particles.

Such a device according to the invention allows the aerosol to be purified by collecting both the finest particles, such as nanoparticles, and the biggest particles, such as micron-sized particles, whilst separating them from each other according to their size range.

The purification device 1 firstly comprises a conduit 11, which is a hollow cylinder of revolution about the longitudinal axis X and which is electrically connected at zero potential.

The collection device 1 comprises four distinct stages 10, 20, 30, 40, inside the conduit 11, in the upstream to downstream direction, between its inlet orifice 17 and its outlet orifice 18.

Figures 1A, 1B, 1C, 1D, 1E, 2:
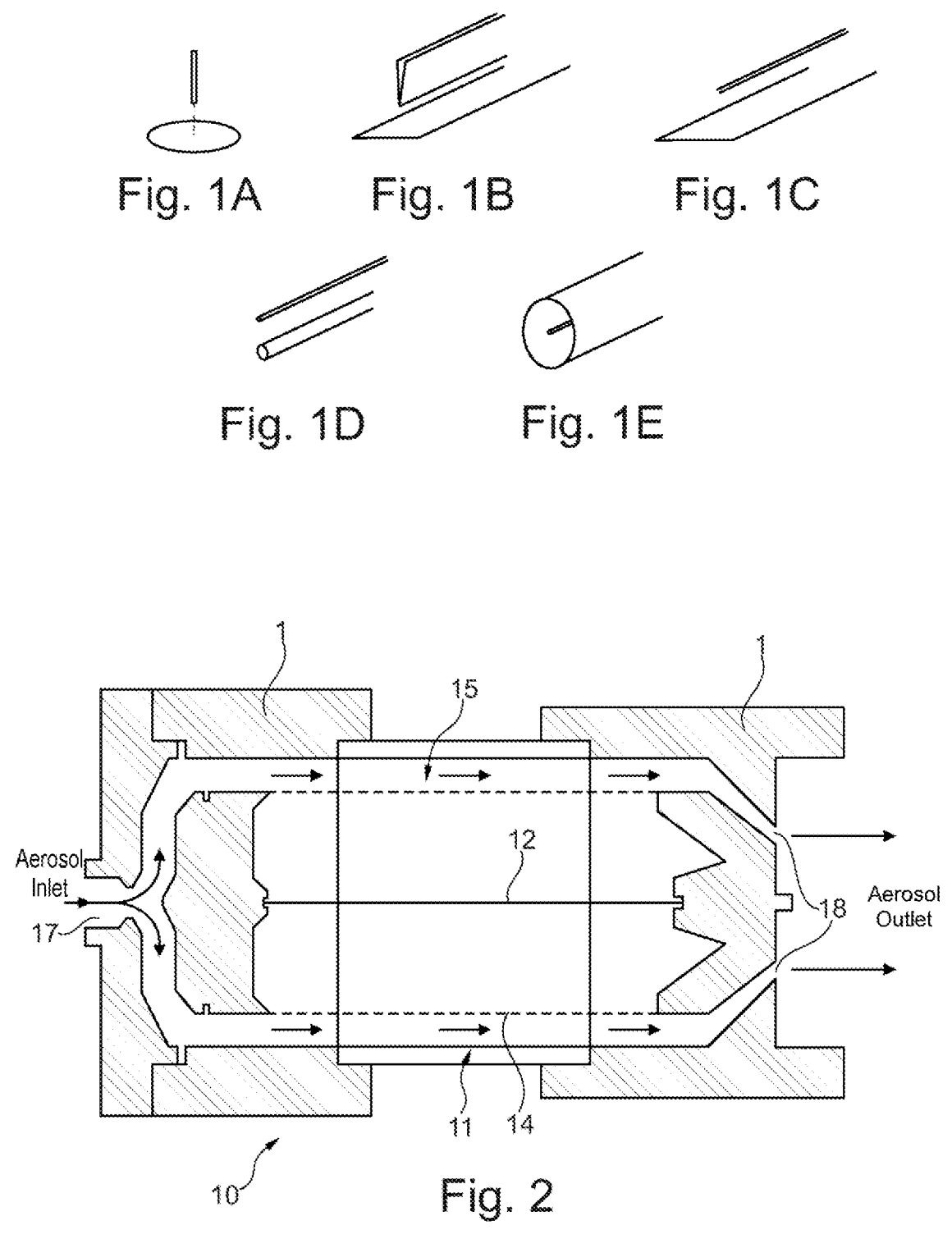

The first stage is formed by a unipolar ion diffusion charger 10 and is similar to that which was previously described with reference to FIG. 2.

The charger 10 thus comprises a central electrode that extends along the axis X in the form of a wire 12 connected to a power supply 13 delivering a high voltage adapted to thus create a corona discharge in the vicinity of the wire 12.

It further comprises a peripheral electrode in the form of a gate 14 connected to a low-voltage power supply 16.

The stage 20, downstream of the charger 10, comprises a central electrode that extends along the axis X in the form of a rod 22 connected to a power supply 23 delivering a medium voltage, adapted to create an electric collection field without a corona effect in the space 21 separating the central electrode 22 and the wall of the conduit 11. A hollow cylinder 24, conforming to the wall of the conduit and forming a first collection substrate Zn, is arranged around the rod 22 opposite thereto.

The stage 30, downstream of the stage 20, comprises a central electrode that extends along the axis X in the form of a wire 32 connected to a high-voltage power supply 33, adapted to create a corona effect in the vicinity of the wire 32 and thus an intense electric field in the space 31 separating the central wire 32 from the conduit 11. A hollow cylinder 34, conforming to the wall of the conduit and forming a second collection substrate Zm, is arranged around the wire 32 opposite thereto.

The stage 40 comprises a structure 41, for example, a "honeycomb" structure, adapted to prevent the appearance of a vortex in the conduit 11, and, downstream, a suction device 42. Depending on the configurations, the collection device according to the invention may dispense with the structure 41.

The operation of the collection device previously described with reference to FIG. 3 is as follows.

Air containing the particles to be collected is sucked through the inlet orifice 17 by the action of the suction device 42.

The finest particles of the aerosol are electrically charged by unipolar ion diffusion in the space 15 separating the gate 14 from the conduit 11.

These finest particles, with high electrical mobility, and the other bigger particles with lower electrical mobility, enter the stage 20.

The electric field without a corona effect created in the space 21 between the rod 22 and the cylinder 24 ensures that the finest particles are collected on the cylinder while defining the first collection substrate Zn.

The other bigger particles are not collected and are still present in the aerosol that enters the third stage 30.

These biggest particles are then electrically charged under the corona discharge effect in the vicinity of the wire 32 and the intense field pervading the space 31 and are collected on the internal wall of the cylinder 34 while defining the second collection substrate Zm.

The air that is purified both of the finest particles deposited on the first collection substrate Zn and of the biggest particles Zm desposited on the second collection substrate Zm is then discharged through the outlet orifice 18 of the device.

Each collection cylinder 24, 34 can be extracted easily from the conduit once the intended collection has been performed.

According to the desired application, each of the substrates Zn and Zm then may be analyzed using conventional physical or physico-chemical characterization techniques, such as optical or electron microscopy, surface scanner, α, β, γ spectrometry if the particles are radioactive, X-ray fluorescence (XRF) spectroscopy, micro X-ray fluorescence (μ-XRF), laser-induced breakdown spectroscopy (LIBS), etc. in order to determine the particle size, on the one hand, of the finest particles and, on the other hand, of the biggest particles, their concentration, their chemical composition and/or their morphology.

One particular application relates to detecting the presence of radioactive particles on the collection substrates without it being necessary to extract them.

Indeed, sequentially, after a collection phase over a time period t1, the device as illustrated in FIG. 3 enables the stages 20 and 30 to operate as ionization chamber for a time period t2.

Via a suitable electronic device, conventional in nuclear instrumentation, the measurement of the ionization current in each stage 20 and 30 makes it possible to detect the presence of radioactive particles with a double interest:
- early detection of an incident in a nuclear facility by monitoring the atmospheric contamination of the air of the premises,
- separation of the radionuclides into two fractions of distinct sizes: the finest particles in the space 20, the biggest in the space 30.

The latter point is of major importance. Specifically, it is often necessary to separate, on the one hand, the aerosol particles that it is desired to detect (such as the plutonium particles in workshops where the size of the aerosols is around 5 μm (median aerodynamic diameter)) and, on the other hand, the natural aerosol bearing radon progeny (much finer aerosol) which forms undesirable background noise. This natural background noise may mask the measurement of the traces of desired radionuclides.

The advantage of such a separation is clearly described in the work under reference [6], page 647 in the paragraph entitled "*Mitigation of Interference from Radon Progeny*", and in article [7].

Other variants and improvements may be implemented without however departing from the scope of the invention, especially for other applications where the advantage of separating an aerosol into two distinct particle size classes is desired, in particular for reusing the finest particles collected on the first substrate and/or the biggest particles on the second substrate.

The invention is not limited to the aforementioned examples; in particular, features of the illustrated examples may be combined in variants that have not been illustrated.

CITED REFERENCES

[1]: W. Hinds, "*Aerosol Technology*", $2^{nd}$ Edition, 1999.

[2]: P. Intra and N. Tippayawong, "*Aerosol an Air Quality Research*", 11: 187-209, 2011.

[3]: G. W. Hewitt, "*The Charging of small Particles for Electrostatic Precipitation*", AIEE Trans., 76: 300-306, 1957.

[4]: G. Biskos, K. Reavell, N. Collings, "*Electrostatic Characterisation of Corona-Wire Aerosol Chargers*", J. Electrostat. 63: 69-82, 2005.

[5]: D. Y. H. Pui, S. Fruin, P. H. McMurry, "*Unipolar Diffusion Charging of Ultrafine Aerosols*", Aerosol Sciences Technology 8: 173-187, 1988.

[6]: P. Kulkarni, P. A. Baron, K. Willeke, "*Aerosol Measurement*" $3^{rd}$ Edition 2011.

[7]: C. Monsanglant-Louvet, F. Gensdarmes, N. Liatimi, S. Pontreau. "*Evaluation des performances des moniteurs de contamination atmospherique en conditions réelles de fonctionnement*" [*Evaluation of the performance of atmospheric contamination monitors under real operating conditions*], Scientific and technical report, IRSN: 251-259, 2008.

The invention claimed is:

1. A method for selectively purifying an aerosol comprising finest and biggest particles, the method comprising the following steps:
   - sucking the aerosol through a conduit comprising an internal wall, from an inlet orifice to an outlet orifice;
   - charging the finest particles, downstream of the inlet orifice, by unipolar ion diffusion in a space between a first electrode under a form of a gate surrounding a second electrode under a form of a wire, and a first conductive portion of the internal wall of the conduit;
   - generating an electric field without a corona effect in a space between a third electrode and a second conductive portion of the internal wall of the conduit, in order to collect the finest particles of said aerosol charged by the unipolar ion diffusion by deposition onto a first collection substrate;
   - generating by an electric current an electric field with a corona effect in a space between a fourth electrode under a form of a wire or a point and a third conductive portion of the internal wall of the conduit, in order to collect the biggest particles of said aerosol not charged by the unipolar ion diffusion by deposition onto a second collection substrate distinct from the first collection substrate;
   - extracting purified air from the outlet orifice of the conduit.

2. The purification method as claimed in claim 1, further comprising at least one step of recycling or reusing the finest particles of said aerosol collected on the first collection substrate and/or the biggest particles of said aerosol collected on the second collection substrate.

3. The purification method as claimed in claim 1, further comprising the following steps:
   a/ collecting radioactive particles on the first and/or the second collection substrate during a time period t1;
   b/ counting pulses generated by the electric current in the space between the third electrode and the second conductive portion of the internal wall of the conduit and the space between the fourth electrode under a form of a wire or a point and the third conductive portion of the internal wall of the conduit, during a time period t2.

* * * * *